US008175082B2

(12) United States Patent
McMahon et al.

(10) Patent No.: US 8,175,082 B2
(45) Date of Patent: *May 8, 2012

(54) TECHNIQUE FOR COMMUNICATING INFORMATION OVER A BROADBAND COMMUNICATIONS NETWORK

(75) Inventors: Stephen J. McMahon, Carlsbad, CA (US); Edwin A. Kruse, San Diego, CA (US)

(73) Assignee: Time Warner Cable, Inc., New York, NY (US)

( * ) Notice: Subject to any disclaimer, the term of this patent is extended or adjusted under 35 U.S.C. 154(b) by 525 days.

This patent is subject to a terminal disclaimer.

(21) Appl. No.: 12/235,943

(22) Filed: Sep. 23, 2008

(65) Prior Publication Data

US 2009/0016327 A1 Jan. 15, 2009

Related U.S. Application Data

(63) Continuation of application No. 10/842,855, filed on May 11, 2004, now Pat. No. 7,447,780.

(60) Provisional application No. 60/524,171, filed on Nov. 21, 2003.

(51) Int. Cl.
*H04L 12/66* (2006.01)

(52) U.S. Cl. ........ 370/352; 370/355; 370/401; 709/223; 709/227; 709/229

(58) Field of Classification Search ................... 370/389, 370/352; 707/1, 3; 709/227
See application file for complete search history.

(56) References Cited

U.S. PATENT DOCUMENTS

| 6,697,357 | B2   |   | 2/2004 | Emerson |         |
|-----------|------|---|--------|---------|---------|
| 7,167,701 | B1   |   | 1/2007 | Jordan  |         |
| 7,496,554 | B2   | * | 2/2009 | Kaplan  | .................... 1/1 |
| 7,512,688 | B2   | * | 3/2009 | Ogushi et al. | ................. 709/227 |
| 7,546,372 | B2   | * | 6/2009 | Allen et al. | .................... 709/229 |
| 2002/0105946 | A1 | * | 8/2002 | Takeuchi | ...................... 370/352 |
| 2003/0031169 | A1 |   | 2/2003 | Emerson |         |
| 2004/0015715 | A1 | * | 1/2004 | Brown   | .......................... 713/200 |

* cited by examiner

*Primary Examiner* — Robert Wilson
*Assistant Examiner* — Mohamed Kamara
(74) *Attorney, Agent, or Firm* — The Marbury Law Group, PLLC

(57) ABSTRACT

A system and method for enabling communications to be transmitted between at least two associated counterpart devices at different locations, e.g., at work and home. One or more communications devices having a first identification code applicable to a first communications network are associated with one or more counterpart devices having a second identification code applicable to a second communications network.

21 Claims, 8 Drawing Sheets

300

| User Name 302 | Telephone Number 304 | MAC Address 306 | Modem IP Address 308 | MTA IP Address 310 | Device Information 312 | Options 314 |
|---|---|---|---|---|---|---|
| Arthur Brown | 2012318058 | 118102 | 0002345 | 0002347 | Cisco 7900 | Dial Plan A; Class A; Features: 1, 3, 4, 9 |
| Sally Smith | 2012318011 | 934101 | 0003344 | 0003356 | Cisco 7900 | Dial Plan B; Class C; Features: 1, 3, 4, 9 |
| . . . | . . . | . . . | . . . | . . . | . . . | . . . |

320 → (points to Arthur Brown row)

FIG. 3

TECHNIQUE FOR COMMUNICATING INFORMATION OVER A BROADBAND COMMUNICATIONS NETWORK

The present application is a continuation of application Ser. No. 10/842,855 filed May 11, 2004, now U.S. Pat. No. 7,447,780 which claims the benefit of U.S. Provisional Application No. 60/524,171 filed on Nov. 21, 2003. The Ser. No. 10/842,855 application and the Ser. No. 60/524,171 application are incorporated by reference in their entirety for all purposes.

FIELD OF THE INVENTION

The invention relates to communications systems and methods, and more particularly to a system and method for delivering voice and data information over a broadband communications network.

BACKGROUND OF THE INVENTION

Due to advances in telecommunications technology, the ability for employees to "telecommute"—i.e., work outside their employer's office while maintaining communication with the workplace—has become more ubiquitous.

In one aspect of telecommuting, employees working from their home may conduct business by using their personal (home) telephone service, thereby using one telephone account and mixing the employees' personal and business matters. Such an arrangement, however, places the expense associated with their business calls on the employees themselves. Even if the employees are reimbursed for work-related expenses, the record-keeping associated with such reimbursement can often be cumbersome. For instance, the employees' business-related telephone service expenses need to be estimated, or the expenses of these calls must be sorted out from expenses associated with the employees' personal calls and then calculated to arrange for reimbursement. Estimated reimbursement may result in an underpayment or overpayment to employees, while an exact calculation may require an inordinate amount of processing resources.

One solution is to establish a separate telephone service account which is dedicated for the employee's business telephone calls. Such an arrangement, however, may be inconvenient and costly as an additional telephone number is assigned for each telecommuter. Thus, a given employee would not only have a workplace telephone number, a home telephone number and in many cases a cellular telephone number, but also a home office telephone number.

Another option available to the telecommuters is the implementation of call-forwarding. Call-forwarding allows for calls made to a device associated with a first telephone number to be forwarded to another device associated with a second telephone number. Although such option enables individuals to, for example, have their calls routed from their workplace telephone to their home telephone, call forwarding has various drawbacks.

First, call forwarding only applies to incoming calls. Thus, if, for example, an employee wants to make a business call from his or her home telephone, call-forwarding does not forward the charges associated with that call from the employee's home account to that of the employee's workplace.

Second, when a call is forwarded from an employee's workplace to the employee's home, typically the employee's personal home telephone system is utilized, thereby reducing the time that this device is available for personal use (as opposed to business use) by, for example, other family members in the home.

Third, a caller who is transferred to the home device can sometimes recognize that the home answering machine (rather than the workplace voicemail system) is accessed. For example, if a caller calls an employee's workplace telephone number, is transferred to the home telephone number and the called party does not answer, the caller will usually receive a response that differs from the response generated had the call not been forwarded. For example an unanswered call placed to an employee's workplace may generate a workplace voice mail message, while an unanswered call forwarded to the employee's home may generate a home answering machine message. If these messages are different (which they typically are), the call-forwarding system is not seamless and the caller knows that the phone call has been transferred from the workplace to a home—a condition that the called party may wish to avoid.

The telecommuting arrangements described thus far also suffer from drawbacks in the forms of security and quality of service. For example, because most individuals utilize the Public Switched Telephone Network (PSTN) to effectuate their telephone calls, telephone access between employees working from their home and their respective workplaces utilizes such network. Although the PSTN has proven to be quite reliable for handling telephone calls, it is not characterized as having a high quality of service (QOS) compared with, e.g., a broadband cable network.

In addition, the PSTN is not particularly secure because it has many points of access by the public to the network, rendering it an easy target for, e.g., wiretapping. Thus, telephone access over such network may raise security considerations. For example, because businesses can suffer harm if sensitive information that is shared between an employee and the employee's workplace is impermissibly accessed, it is important that such information is not intercepted (or wiretapped) by third parties.

SUMMARY OF THE INVENTION

Systems and methods are provided in which voice and data communications may be made between associated counterpart devices. The invention is directed to methods and systems for enabling communications to be transmitted over a broadband communications network between at least two associated devices when communication by any of the associated devices with another (unassociated) device is established.

Thus, according to an aspect of the invention, a remote device is considered associated with a local device if the two devices have associated identification codes and the devices act as counterparts to one another. In this context, two devices act as counterparts to one another if each of the devices has the ability to receive and/or send substantially the same communication at substantially the same time.

Thus, in accordance with an embodiment of the invention, establishing a communication between a first device (e.g., a home telephone) and a second device is attempted by receiving from the first device a request to establish the communication with the second device. A first identification code identifying the first device and the second identification code identifying the second device are derived from the request. Based on the first identification code, a third identification code identifying a third device (e.g., a workplace telephone) is accessed, which is stored in association with the first identification code. The first identification code and second identification code are then used to establish a connection for allowing the communication between the first device and the second device. A record of the communication is generated, which contains the third identification code to associate the connection with the third device. In one embodiment, the first device comprises a home telephone and the third device comprises an associated workplace telephone. In another embodiment, the first device comprises a workplace telephone and the third device comprises an associated home telephone.

In accordance with another aspect of the invention, establishing a communication between a first device and a second device (e.g., a home telephone) is attempted by receiving from the first device a request to establish the communication with the second device. A first identification code identifying the second device is derived from the request. The first identification code is then used to attempt establishing a connection for allowing the communication between the first device and the second device. Based on the first identification code, a second identification code identifying a third device (e.g., a workplace telephone) is accessed, which is stored in association with the first identification code. The second identification code is then used to attempt establishing a connection for allowing the communication between the first device and the third device. In one embodiment, the second device comprises a home telephone and the third device comprises an associated workplace telephone. In another embodiment, the second device comprises a workplace telephone and the third device comprises an associated home telephone.

BRIEF DESCRIPTION OF THE DRAWINGS

Further objects, features and advantages of the invention will become apparent from the following detailed description taken in conjunction with the accompanying drawings showing illustrative embodiments of the invention, in which:

FIG. 3 is a table illustrating records stored and accessed by the host of FIG. 1, in accordance with an embodiment of the invention;

DETAILED DESCRIPTION

The invention is directed to methods and systems for enabling voice and/or data communications to be transmitted over a broadband communications network between at least one remote site, such as the home office of a telecommuter, and a local site, such as the telecommuter's employer's workplace. In accordance with an embodiment of the invention, one or more communications devices located at a remote site (i.e., remote device(s)) are associated with one or more device (s) located at a local site by one or more identification codes.

Thus, for example, an employee's telephone at a local site (such as a workplace) has an assigned telephone number and is associated with a telephone at a remote site (such as the employer's home office) by a media access control (MAC) address or some other identifier assigned thereto.

Thus, according to an aspect of the invention, a remote device is considered associated with a local device if the two devices have associated identification codes and the devices act as counterparts to one another. In this context, two devices act as counterparts to one another if each of the devices has the ability to receive and/or send substantially the same information at substantially the same time.

Figure 1:
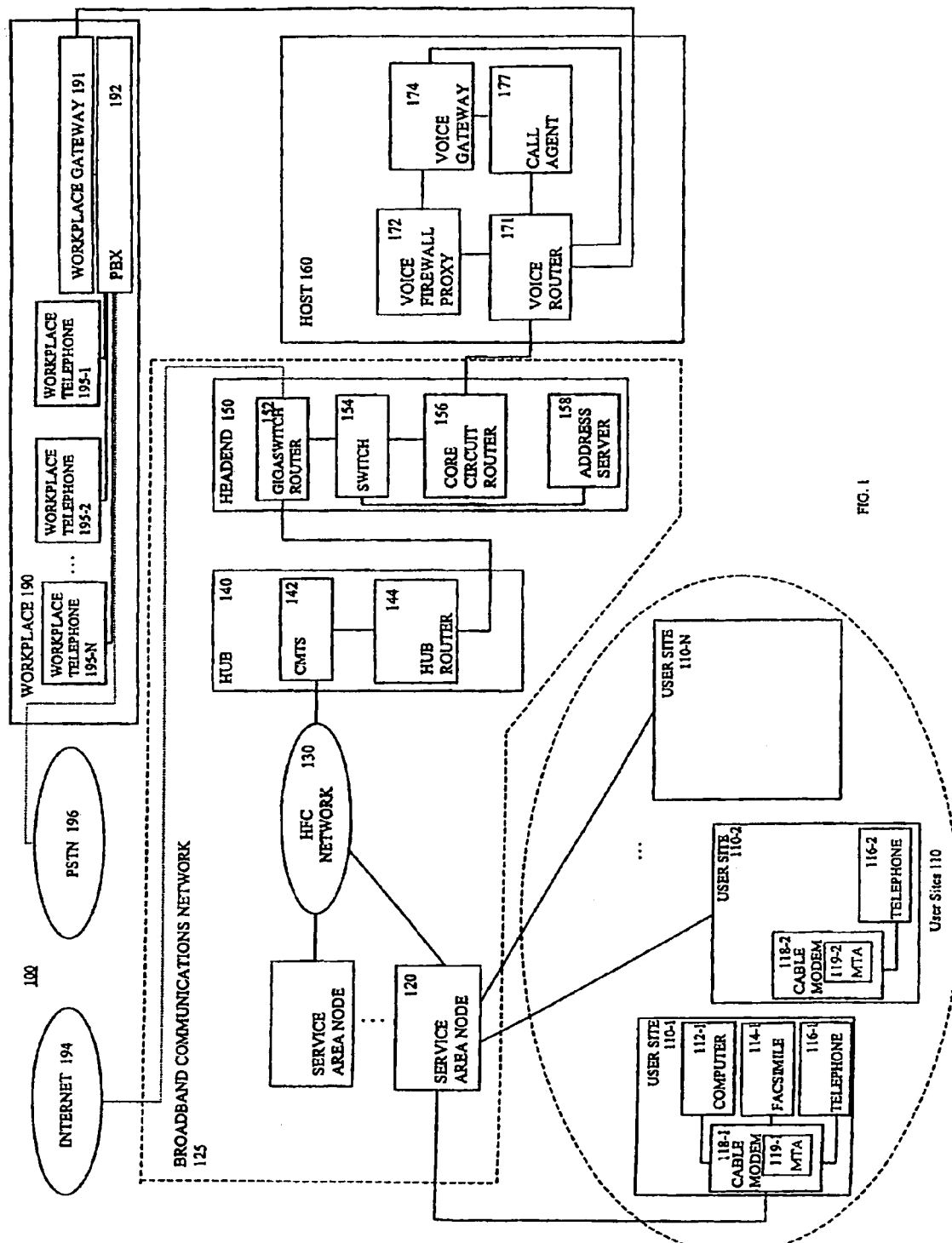
FIG. 1 is a block diagram illustrating a broadband communications system, in accordance with an embodiment of the invention.

FIG. 1 illustrates system 100 embodying the principles of the invention for delivering information over broadband communications network 125, which comprises, e.g., a hybrid fiber coaxial (HFC) cable network 130. In system 100, information is exchanged between at least one user site, e.g., user site 110-1, and the user's workplace 190. Broadband communications network 125, in this instance, is a cable system for delivering, in accordance with the invention, voice information between user site 110-1 and workplace 190. As shown in FIG. 1, broadband communications network 125 includes various service area nodes including node 120, hybrid fiber coax (HFC) cable network 130, hub 140 and headend 150 for establishing communications between users at sites 110 and workplace 190. In this instance, node 120 is connected to user sites 110-1 through 110-N in a neighborhood, where N represents an integer. Each node 120, in this example, may serve approximately 500 user sites 110.

In this instance, hub 140 is connected to headend 150 via an Internet Protocol (IP) transport on the one hand and to HFC cable network 130 on the other hand. Hub 140 comprises, among other things, cable modem termination system (CMTS) 142 and hub router 144. Hub 140, in this example, facilitates delivery of information across approximately 40 nodes, thereby serving as many as approximately 20,000 user sites. Hub 140 is connected to headend 150 by a ring of fiber optic cables and, as described below, supports transmission of information between user site 110-1 and workplace 190.

Headend 150, which includes gigaswitch router 152, switch 154, core circuit router 156 and address server 158, is in communication with host 160 as well as hub router 144 of hub 140. Thus, headend 150 serves as an interface between host 160 and the user sites 110 via hub 140, HFC 130 and node 120, as illustrated in FIG. 1.

In accordance with an embodiment of the invention, host 160 is configured to, among other things, establish communication between local and remote counterpart communication devices, when either of these communication devices (local or remote devices) are involved in communications activity.

In accordance with an embodiment of the invention, user site 110-1, generically representing one of the many sites 110, is equipped with communication devices for communicating through network 130, which may be, e.g., computer 112-1, facsimile device 114-1 and telephone 116-1. It should be noted that, in accordance with another embodiment of the invention, user site 110-1 may be equipped with a subset of these devices or may include additional devices that are capable of and configured for receiving and/or transmitting information through a broadband communications network. For example, user site 110-2 is equipped with telephone 116-2 for communicating through broadband communications network 125.

In this illustrative embodiment, communication devices 112-1, 114-1 and 116-1 located at user site 110-1 are connected to cable modem 118-1. Cable modem 118-1 modulates and demodulates transmissions between the communications devices 112-1, 114-1 and 116-1 at user site 110-1 and the node 120 that is in communication with such user site. In this instance, cable modem 118-1 comprises a multimedia terminal adapter (MTA) 119-1 for enabling modem 118-1 to support both voice and data transmissions. An example of a well-known cable modem equipped with an MTA is the Motorola SBV 4200 cable modem. Thus, the cable modem itself handles data transmissions sent and received at user site 110-1, whereas MTA 119-1 incorporated within cable modem 118-1 enables the communication of voice information that is sent to and from user site 110-1.

Each communications device 112-1, 114-1, and 116-1 may have a MAC address and a designated IP address. The MAC address is the hardware address that uniquely identifies each user device located at user sites 110, and the associated IP address is the address that is uniquely designated to each device located at user-site 110-1.

Turning to hub 140, CMTS 142 is configured for sending and receiving digital cable modem signals on HFC cable network 130. In this example, CMTS 142 may be a Cisco VXR CMTS or Motorola BSR CMTS. CMTS 142 receives upstream voice and data signals from modem 118-1 and packetizes the information from the signals into IP packets and routes them to the hub router 144. Further, CMTS 142 sends signals downstream to modem 118-1 user in site 110-1, which contain data and voice information.

Connected to CMTS 142 is hub router 144 which, in this example, is a typical passive routing device (such as a Cisco 10720. Router). Hub router 144, among other things, provides the connectivity between hub 140 and headend 150, to gigaswitch router 152 via a fiber network (such as an OC48 fiber ring). In addition to receiving information from hub router 144, gigaswitch router 152 receives all traffic from switch 154 in headend 150 for transmission downstream to user site 110-1. Gigaswitch router 152 also serves as the gateway between the Internet 194 on the one hand and user sites 110 on the other hand for communications over the Internet 194.

Core circuit router 156 is in communication with switch 154 and host 160. Core circuit router 156 is configured for, among other things, reading packets that are sent by communication devices 112-1, 114-1, 116-1 for determining where packetized data should be transmitted—such as to host 160 or some other host (not shown). Core circuit router 156, in this example, may be a Cisco 7513. Router, and contains a well known channel service unit (CSU) and data service unit (DSU). The CSU connects headend 150 with host 160 via digital connectivity, e.g., a T-1 line, and the DSU in a well known manner performs protective and diagnostic functions for the T-1 line to better the service. By equipping host 160 with corresponding CSU and DSU units connected to T-1 connections (or some other high-speed connections) between core circuit router 156 and host 160 is established for the communication of, for example, voice traffic between host 160 and user sites 110, as described below.

When a communications device is initially configured at user site 110-1 for communications through broadband communication network 125, a preliminary communication between the device and headend 150 is established. Such configuration is described with reference to the flowchart illustrated by FIGS. 2A (for a modem) and 2B (for an MTA).

Figure 2A:
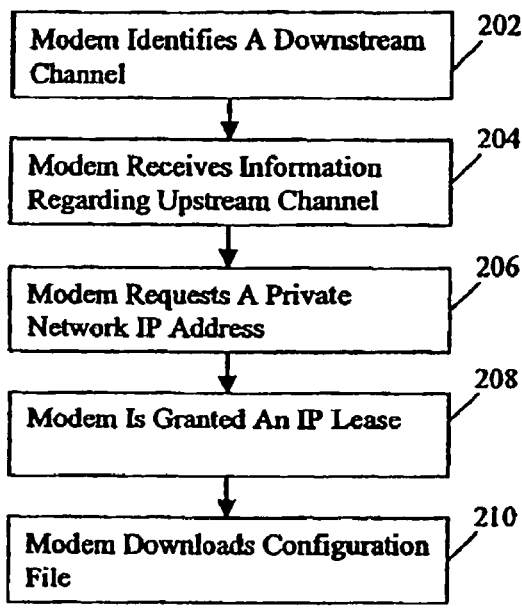
FIGS. 2A and 2B are flowcharts illustrating processes for configuring communications devices to access and communicate over the system of FIG. 1, in accordance with an embodiment of the invention.

Referring to FIG. 2A, for example, when cable modem 118-1 is initially connected to network 125, modem 118-1 searches for and identifies a downstream channel within, for example, the Data Over Cable Service Interface Specification (DOCSIS) (step 202). When modem 118-1 identifies and locks onto a downstream channel, modem 118-1 establishes communication with CMTS 142 via HFC network 130. Next, at step 204, CMTS 142 identifies an upstream channel and informs modem 118-1 of the upstream channel identification information. Once the downstream and upstream channels are identified by modem 118-1, modem 118-1 then requests a private network IP address from address server 158 (step 206). If the MAC address of modem 118-1 is recognized by voice call agent 177, then modem 118-1 is granted an IP lease (i.e., session) (step 208) and is authorized to download a configuration file based on the modem's MAC address (step 210). The configuration may be downloaded using, for example, the trivial file transfer protocol and may be encrypted with, for example, an MD5 encryption file.

Figure 2B:
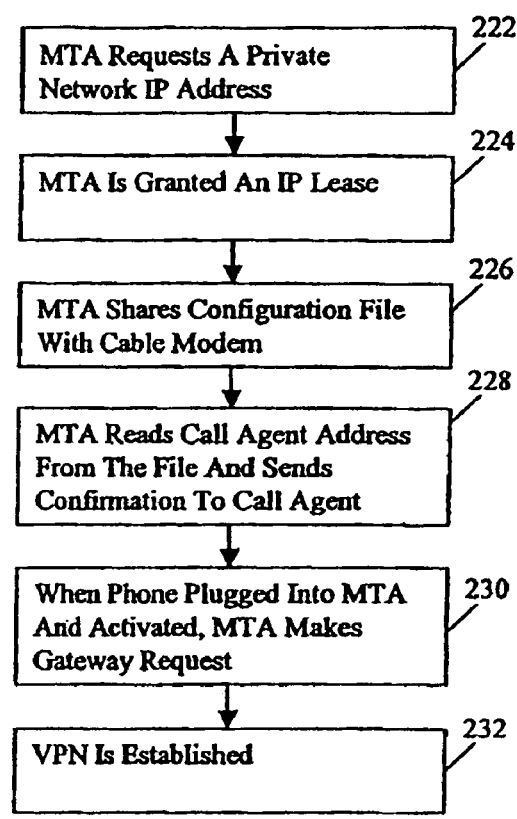

Once modem 118-1 is configured, MTA 119-1, within modem 118-1, can also be configured. Thus, turning to FIG. 2B, at step 222, MTA 119-1 requests an IP address from address server 158, and if the MAC address of MTA 119-1 matches voice call agent 177, MTA 119-1 is granted an IP lease (step 224). Next, at step 226, MTA 119-1 shares the MD-5 configuration file with cable modem 118-1. At step 228, MTA 119-1 identifies the host 160 associated with MTA 119-1 by reading the address of voice call agent 177 of host 160 and sends a confirmation message to call agent 177. When telephone 116-1 is plugged into MTA 119-1 and activated (e.g., receiver is lifted, speakerphone is accessed, etc.), MTA 119-1 makes a request to voice gateway 174 (step 230). Gateway 174 stores a list of acceptable IP addresses, and if a match is made between the stored list and the IP address assigned to MTA 119-1, voice call agent 177 establishes a virtual private network (VPN) connection with telephone 116-1 (step 232) and, as described below, forwards the features of an associated telephone (such as workplace telephone 195-1) to telephone 116-1. These features may include hold, transfer, distinctive ringing, call park, intercom, auto-attendants, announcements, programmable menus, and the like.

The MAC address of modem 118-1 is maintained in a registration table (not shown) by CMTS 142 as well as by address server 158. These MAC addresses are stored to ensure that the devices (such as modem 118-1, MTA 119-1) that are connected to system 125 are authorized devices (e.g., properly registered with host 160).

In accordance with an embodiment of the invention, communication device addresses (e.g., MAC addresses, IP addresses) are also stored by host 160, wherein the addresses pertaining to, for example, telephones 116-1 and 116-2 are stored by the workplace's call agent 177. Such address storage of specific IP addresses corresponding to user devices occurs when the IP addresses that are assigned to devices are static—i.e., permanent with respect to each device.

In an alternate embodiment, IP addresses may be dynamically assigned to a device by address server 158—i.e., IP address assignments only last for a given session. With a system utilizing dynamically assigned IP addresses, call agent 177 of host 160 stores the range of possible IP addresses, as opposed to the specific IP address, for each user device from which users will be drawing.

FIG. 3 illustrates table 300 that represents the storage of addresses associated with telephone 116-1 of user site 110-1. This information is stored by voice call agent 177. It should be noted that, in accordance with an embodiment of the invention, although telephone 116-1 is located in user site 110-1, such telephone acts as a counterpart, remote extension to the user's telephone in workplace 190 (such as workplace telephone 195-1) pursuant to an association in Table 300 between the MAC address of telephone 116-1 and the corresponding telephone number of workplace telephone 195-1.

With the invention, telephone 116-1 located at user site 110-1 works as though it had the same telephone number as the user's corresponding workplace telephone, such as telephone 195-1, and can ring instead of, immediately after, or contemporaneously with the user's corresponding workplace telephone when such telephone number is called (unless, for example, a "no ring" feature is activated on one or both of the telephones). In addition, activity is associated with such telephone number when either the user's workplace telephone 195-1 associated with such telephone number is used or when the user's telephone 116-1 at user site 110-1, whose MAC address is associated with that telephone number, is used.

Each row in table 300 makes up a record for a user's device and, in this case, comprises seven fields—the name of the user 302 associated with the device, the telephone number 304 of the device, the device's MAC address 306, the modem's IP address 308, the MTA's IP address 310, descriptive information 312 concerning the device (such as device manufacturer's name and device model information), and options 314 respecting the device/user (such as the user's dialing plan, the class of service and the features associated with the telephone). Thus, turning to record 320, for example, user (302) Arthur Brown has a communication device bearing a telephone number (304) of "2012318058" and a MAC address (306) of "118102." The device, in this case, is hooked up to a modem bearing the IP address (308) "0002345" and the modem comprises an MTA having an IP address (310) of "0002347." The device information (312) indicates that the user device is Cisco VoIP telephone, model number 7900, and that the user has dialing plan A (e.g., viaIP Dialing Plan), service class A (e.g., Class-5 Services) and features 1 (e.g., call waiting), 3 (e.g., hold), 4 (e.g., transfer) and 9 (voice mail messaging). It should be noted that in this illustration the modem and MTA's IP addresses (308 and 310, respectively) are static because the IP address designations are permanent. In an alternative embodiment, the IP addresses may be dynamically assigned as described above. In such case, these identifiers would only be stored as part of record 320 on a communication-by-communication basis.

It should also be noted that, in accordance with an embodiment of the invention, devices that are associated with one another, such as telephones 116-1 and 195-1, are configured to have one or more common features. Thus, for example, by provisioning associated telephones 116-1 and 195-1 with the same voice mail messaging feature, a call placed to either (or both) telephone(s) will receive the same voice mail message when the telephone(s) are not answered. In addition, a user of these telephones can access the voice mail feature associated with these telephones from either device.

Figure 4:
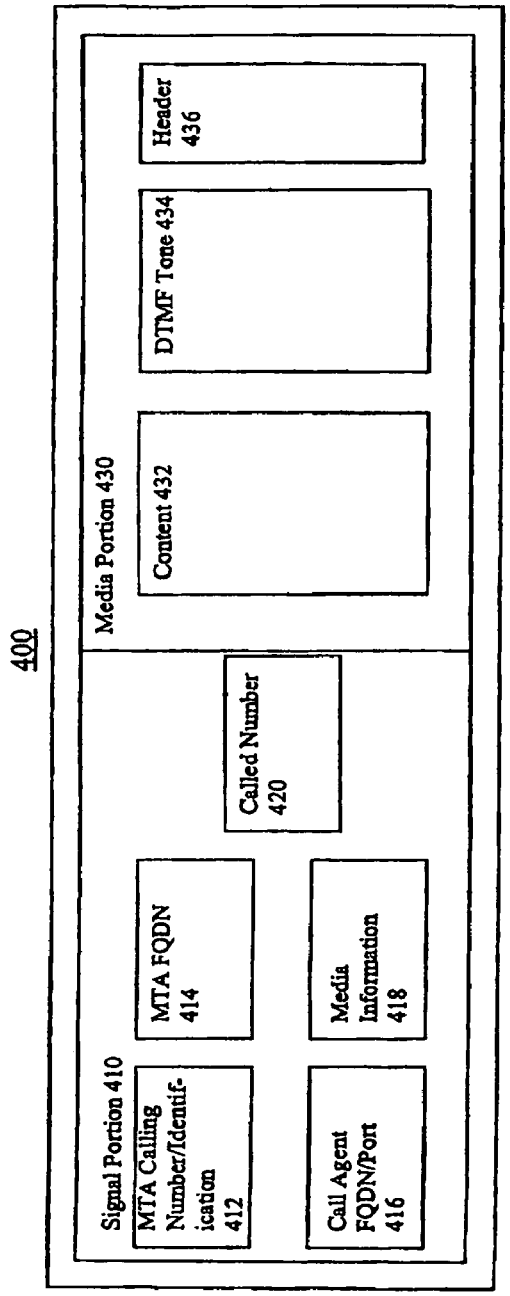
FIG. 4 is a representation of a voice packet processed by the host of FIG. 1, in accordance with an embodiment of the invention.

When information is transmitted through network 125, such information is packaged into packets (or packetized) using, for example, a standard voice over IP (VoIP) protocol. FIG. 4 illustrates a representation of a voice packet 400 transmitted using system 100.

Voice packet 400 includes a signal portion 410 and a media portion 430. In accordance with an embodiment of the invention, signal portion 410 utilizes a media gateway control (MGC) protocol network-based call signaling (NCS) profile. The NCS profile allows a central call-control mechanism to control customer premises equipment (CPE) devices for voice services, and contains the following information: MTA calling number and calling number identification 412 (e.g., dialed number identification service (DNIS) identifier), MTA fully qualified domain name (FQDN) 414, call agent FQDN and port information 416, media information 418 and the called number 420. The MTA calling number/identification information 412 identifies the device that is making the call. The MTA FQDN 414 consists of the host and domain name associated with, for example, MTA 119-1 and is deduced from the MAC address of MTA 119-1 by referring to the name associated with the MTA MAC address stored by address server 158. Call agent FQDN/port information 416 is the information used to identify the associated voice call agent 177. Media information 418 includes, e.g., the relevant coder/decoder (codec) information, telephone events and media packet IP addresses and ports. Called number 420 is the number that is dialed by the caller.

Media portion 430 is formatted in accordance with a real-time transfer protocol (RTP), and includes, e.g., content 432, dual tone multi-frequency (DTMF) information 434 and header information 436. In a well known manner, RTP facilitates the reconstruction of a coherent media stream from a sequence of received packets and provides functions such as sequence numbering to facilitate the reconstruction. The combined headers for the transmission of real-time multimedia information over IP-based networks includes an IP header, the UDP header and the RTP header. This combined RTP/UDP/IP header is simply referred to as header 436 in FIG. 4. To facilitate VoIP transmission by system 125, a combined RTP/UDP/IP compression algorithm is utilized. Content 432 contains encoded voice information using a standard codec algorithm, such as a G711 or G728 codec algorithm, according to the request by voice call agent 177. DTMF events are also sent through the RTP stream, thereby facilitating the identity of each tone as necessary.

Figure 5:
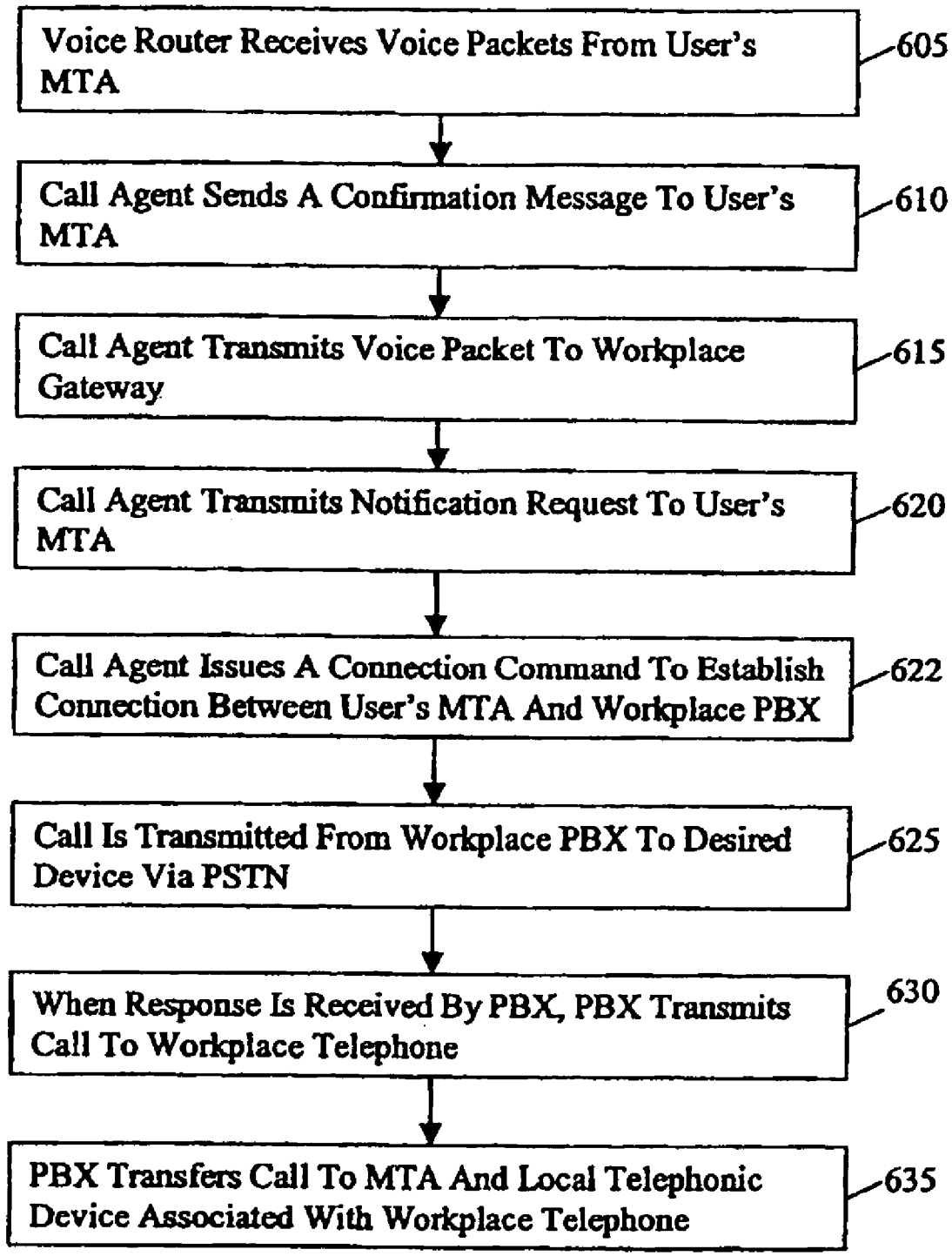
FIG. 5 is a flowchart illustrating the process for establishing an outbound voice communication by a user of the broadband communication system of FIG. 1, in accordance with an embodiment of the invention.
Figure 6:
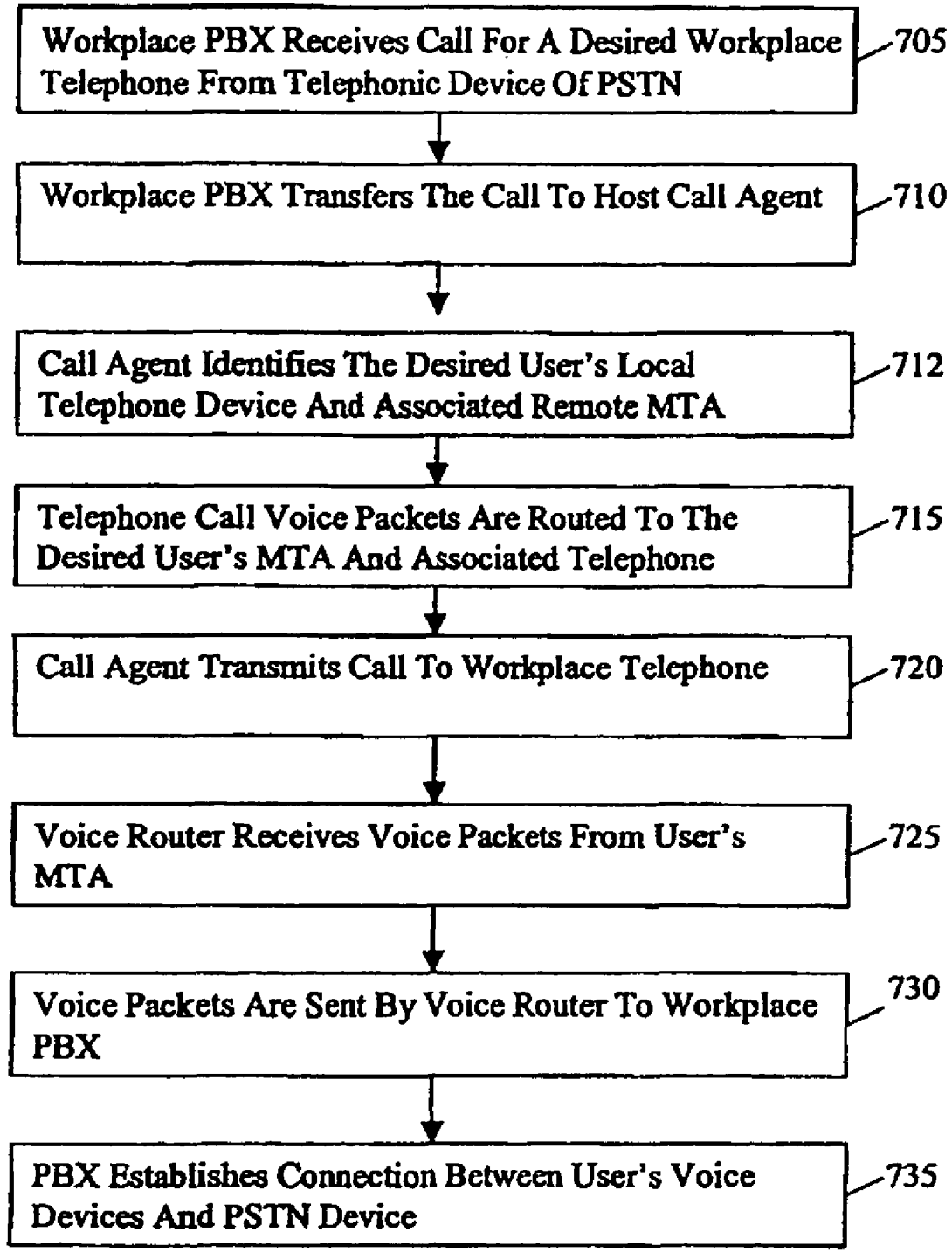
FIG. 6 is a flowchart illustrating the process for establishing an inbound voice communication by a user of the broadband communication network of FIG. 1, in accordance with an embodiment of the invention.
Figure 7:
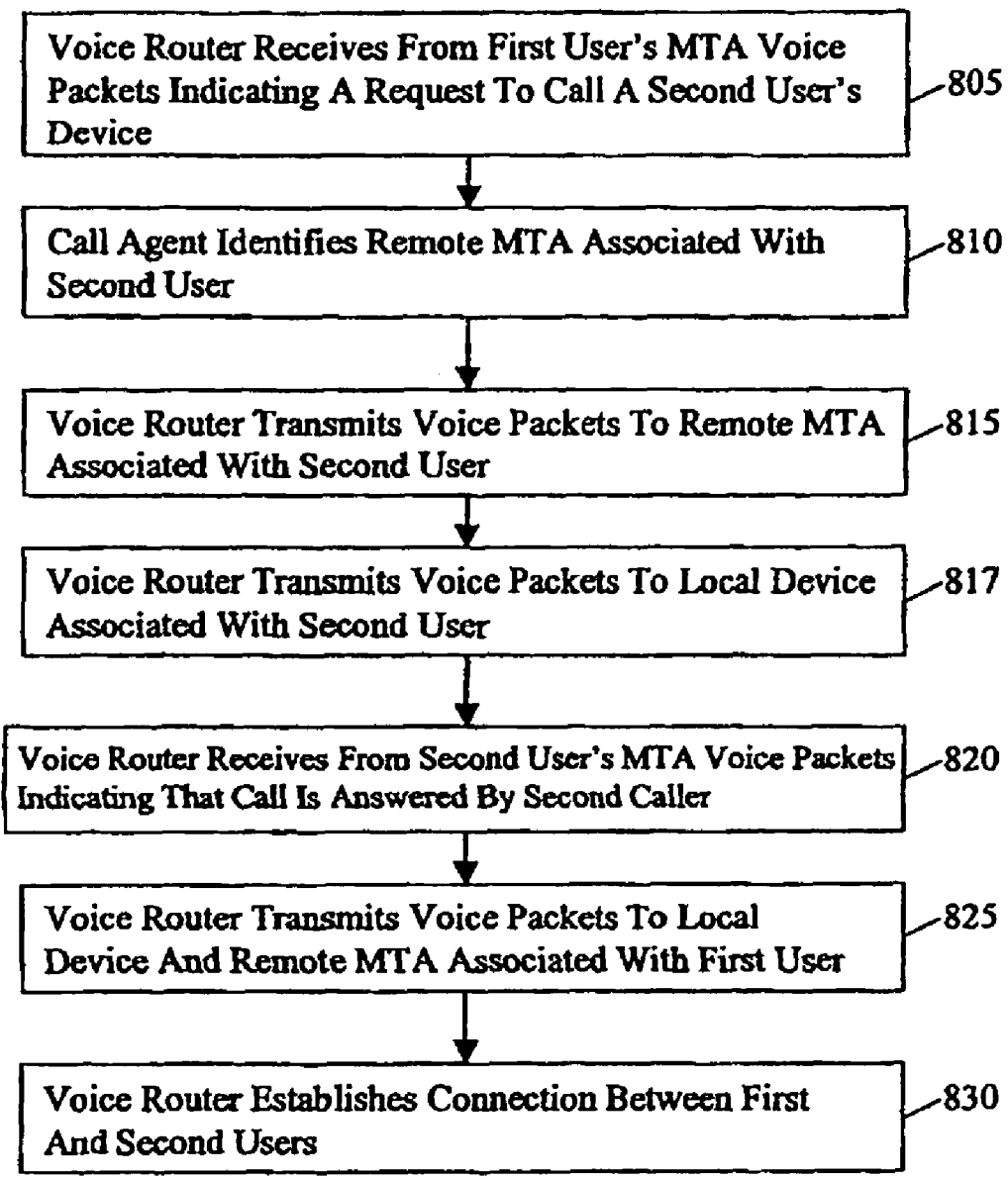
FIG. 7 is a flowchart illustrating the process for establishing a voice communication between a plurality of devices associated with the broadband communications network of FIG. 1, in accordance with an embodiment of the invention.

In accordance with an embodiment of the invention, telephone calls involving the system of FIG. 1 can be categorized into three groups. A first category of calls are outgoing calls by a user at a user site, let's say site 110-1 to a public telecommunications network, for example PSTN 196. A second category of calls are incoming calls to a user site from, for example, PSTN 196. A third category of calls, referred to as intersite calls, involves a user at one user site (e.g., user site 110-1) calling a telephonic device located at another user site (e.g., user site 110-2). FIGS. 5-7 are flowcharts illustrating an example for each of these categories of calls.

FIG. 5 is a flowchart illustrating the process for establishing an outbound voice communication by a device connected to broadband communication network 125 of FIG. 1 in accordance with an embodiment of the invention. In this example, a user at, let's say, user site 110-1, takes telephone 116-1 off hook and dials the telephone number for a desired user. In this case, the desired user's telephonic device (not shown) is connected to PSTN 196.

When user telephone 116-1 goes off hook, radio frequency (RF) signals carrying voice packets are generated by MTA 119-1 of cable modem 118-1 and are transmitted to CMTS 142. The voice packet data includes, among other things, the IP address assigned to MTA 119-1 and the MAC address assigned to telephone 116-1. These addresses serve as a return receipt for the telephone call, such that the source of the generated voice packets (in this case MTA 119-1 and telephone 116-1 attached thereto) may be identified and a return path established. Hub 140 receives the voice packets from CMTS 142 at hub router 144, which then transmits the voice packets to core circuit router 156 for transmission by an operations fiber circuit to voice router 171 of host 160 (step 605).

In accordance with an embodiment of the invention, the transmission of the voice packets by core circuit router 156 to voice router 171 is accomplished by the network-based call signaling (NCS) profile described above in accordance with the well known MGC protocol. Such protocol enables the transmission of voice packets using the Internet Protocol, or VoIP, thereby enabling transmission of voice information in digital form in discrete packets rather than in the traditional circuit-committed protocols of, for example, the PSTN.

The voice packets are then forwarded to voice firewall proxy 172 to determine whether the received packets should be forwarded to their destination. This may be accomplished, for example, by verifying that the received packets were sent from an acceptable IP address.

If the received packets are acceptable to voice firewall proxy 172, the voice packets are then transmitted by voice router 171 to call agent 177, thereby allowing call agent 177 to send a confirmation to MTA 119-1 indicating that host 160 has received the voice packets generated by telephone 116-1 and MTA 119-1 and that the communication using broadband communications system 125 is authorized (step 610). Call agent 177 authorizes a received communication by searching the records illustrated in table 300 (FIG. 3). If a record matching the identification information stored by the received voice packets is found (e.g., MTA IP address, telephone MAC address), then the communication is authorized. Upon authorizing the communication, the confirmation message is generated using, for example, the well-known serial data control (SDC) protocol.

Call agent 177 then sends the received voice packets via voice router 171 to customer gateway 191 of customer premises 190 (step 615). This is accomplished using the MGC and trunking gateway control (TGC) protocols. These protocols, among other things, enable call agent 177 to request that voice gateway 174 send a notification to user MTA 119-1 indicating that the voice packets have been transmitted to customer premises 190 (step 620).

Upon receiving the notification, MTA 119-1 sends a confirmation to call agent 177 to acknowledge receipt of such notification. When such confirmation is received, call agent 177 issues a connection command to establish a connection between MTA 119-1 and PBX 192 via customer gateway 191 (step 622). In this case, the connection between the customer gateway 191 and PBX 192 uses an access trunk known as Integrated Services Digital Network Primary Rate Interface (ISDN PRI).

Next, based upon the packet header information that stores the address information for identifying the desired device, the call is transmitted from PBX 192 over the PSTN 196 to the device (not shown) desired by the user of user site 110-1 (step 625).

PBX 192 then awaits a response (e.g., an answer, busy signal, ring-no answer, etc.) from the desired device associated with PSTN 196. When a response is received, PBX 192 transmits the received voice packets to the workplace telephone device associated with the telephone number that initiated the call and to workplace gateway 191 (step 630) via the ISDN PRI access trunk described above. Then, at step 635, workplace gateway 191 transfers the voice packets that make up the call to MTA 119-1.

The voice packets are transmitted to MTA 119-1 from call agent 177 by sending the packets to voice router 171 using the SDC and MGC protocols identified above, and then from voice router 171 to core circuit router 156 using an NCS profile in accordance with the MGC protocol. The voice packets are in turn routed from core circuit router 156 to gigaswitch router 152 of headend 150 and to the appropriate hub 140 via hub router 144. Hub router 144 then directs the voice packets to CMTS 142, which sends the packets via RF signals to MTA 119-1.

User telephone 116-1 and associated workplace telephone 195-1 thereby connected with the destination telephone (not shown) of PSTN 196, and voice communication between the devices is established. In addition, voice communication between user telephones 116-1 and 195-1 is established, in the event that both telephones are picked up during the telephone call with the destination PSTN telephone. Such communication is enabled by voice router 171 of host 160 which reads the address (MAC and/or IP) of the telephone that generates a communication and forwards the communication to the telephonic devices associated thereto. Associated devices are identified by accessing table 300 stored by call agent 177.

When outgoing calls are made by telephone 116-1, the association of user site telephone 116-1 and counterpart workplace telephone 195-1 also enables a recording function. In accordance with an embodiment of the invention, each time a call is placed by a device at one of the user sites 110, a record may be generated that records the details of the call, including an identifier (such as MAC address) associated with, for example, telephone 116-1 and an identifier corresponding to the associated workplace telephone, such as telephone 195-1. The record may also include the time the call was initiated and terminated, the length of the call, the telephone number of the called device, the location of the called device, and the like.

FIG. 6 is a flowchart illustrating the process for establishing an inbound voice communication to a device connected to the broadband communication network 125 of FIG. 1, in accordance with an embodiment of the invention. In this example, a call is placed using a device (not shown) connected to a public network, such as PSTN 196, and dials a telephone number associated with, let's say workplace telephone 195-1 and thus telephone 116-1 of user site 110-1, in accordance with the invention.

When the device connected to PSTN 196 dials a telephone number associated with workplace telephone number 195-1 and telephone 116-1, the telephone call is received by PBX 192 of workplace 190 (step 705). PBX 192 transfers the call to workplace gateway 191 using the ISDN PRI access trunk described above. The packets received by workplace gateway 191 are transmitted to voice router 171, then voice firewall proxy 172, then to voice gateway 174 (if the packets are accepted by proxy 172) and ultimately to call agent 177 using the aforementioned MGC and TGC protocols (step 710).

Accessing table 300, call agent 177 identifies the telephone devices associated with the telephone number that was called by the PSTN device (not shown) (step 712). This is accomplished by reading the data in called number field 420 (FIG. 4), identifying the record in table 300 (FIG. 3) corresponding to the called number and then identifying the telephone devices associated with the called number by, for example, associated IP and MAC addresses (see, e.g., fields 306, 308 and 310 of table 300).

Upon identifying the desired telephone devices (in this case work telephone 195-1 and telephone 116-1 of user site 110-1) and associated modem 118-1 and MTA 119-1, call agent 177 of host 160 initiates transmission of the received voice packets to telephone 116-1 (step 715). In so doing, call agent 177 transmits the voice packets to voice router 171 using the MGC and SDC protocols described above. The packets are sent from router 171 to circuit router 156 by the NCS/MGC protocol also described above, and then routed to gigaswitch router 152 of headend 150. The gigaswitch router further routes the voice packets to the appropriate hub (in this case hub 140) for receipt by hub router 144. Hub router 144 directs the voice packets to CMTS 142 for forwarding to destination MTA 119-1.

In addition, voice router 171 informs PBX 192 that the appropriate remote MTA has been identified by call agent 177 and that the voice packets should be routed to the workplace telephone 195-1 associated with the called number (step 720).

At this time, the desired telephone devices 195-1 and 116-1 ring. If, for example, telephone 116-1 goes off-hook while the phone is ringing, RF signals leave the cable modem carrying voice packets generated by telephone 116-1 and MTA 119-1 and are forwarded to voice router 171 (in the same manner as described above)(step 725). Voice router 171 then forwards the voice packets received from MTA 119-1 to call agent 177 using the SDC and MGC protocols and are then routed to workplace gateway 191 and ultimately PBX 192 via a T1 fiber circuit established between host 160 and workplace 190 (step 730). PBX 192 then establishes a connection between the PSTN device (not shown) and telephone 116-1 and workplace telephone 195-1 (step 735). In addition, voice communication between user telephones 116-1 and 195-1 is established, in the event that both telephones are picked up during the telephone call with the destination PSTN telephone. Such communication is enabled by voice router 171 of host 160 which reads the address (MAC and/or IP) of the telephone that generates a communication and forwards the communication to the telephonic devices associated thereto. Associated devices are identified by accessing table 300 stored by call agent 177.

FIG. 7 is a flowchart illustrating the process for establishing a voice communication between two devices connected to the broadband communication network 125 of FIG. 1, in accordance with an embodiment of the invention. Thus, this example covers the intersite call situation wherein a user using telephone 116-1 (associated with, for example, workplace telephone 195-1) at user site 110-1 calls a number associated with a second telephone, such as telephone 116-2 at user site 110-2, which is associated with workplace telephone 195-2.

When telephone 116-1 is taken off-hook and is used to dial a telephone 116-2, RF signals carrying voice packets are generated by MTA 119-1 of cable modem 118-1 and are transmitted to CMTS 142. The voice packet data includes, among other things, the IP address assigned to MTA 119-1 and the MTA address assigned to telephone 116-1. These addresses serve as a return receipt for the telephone call, such that the source of the generated voice packets (in this case MTA 119-1 and telephone 116-1 attached thereto) may be identified and a return path established. Hub 140 receives the voice packets from CMTS 142 at hub router 144, which then transmits the voice packets to core circuit router 156 for transmission by an operations fiber circuit to voice router 171 of host 160 (step 805).

In accordance with an embodiment of the invention, the transmission of the voice packets by core circuit router 156 to voice router 171 is accomplished by the NCS/MGC protocol described above.

The voice packets are then forwarded to voice firewall proxy 172 to determine whether the received packets should be forwarded to their destination. If the received packets are acceptable to voice firewall proxy 172, the voice packets are then transmitted back to voice router 171 and then to call agent 177 using the SDC protocol, thereby allowing call agent 177 to send a confirmation message to MTA 119-1 indicating that host 160 has received the voice packets generated by telephone 116-1 and MTA 119-1. Call agent 177 authorizes a received communication by searching the records illustrated in table 300 (FIG. 3). If a record matching the identification information stored by the received voice packets is found (e.g., MTA IP address, telephone MAC address), then the communication is authorized.

Upon authorizing the communication, call agent 177 routes the call back to voice router 171 so that the MTA associated with the called number (in this case MTA 119-2) can be read (step 810). The associated MTA address is identified using the data stored in call agent 177 as illustrated by table 300.

Voice router 171 then routes the received voice packets to MTA 119-2 and ultimately telephone 116-2 (step 815). As described above, voice packets are transmitted from voice router 171 to core circuit router 156 using NCS in accordance with the MGC protocol. The voice packets are in turn routed from core circuit router 156 to gigaswitch router 152 of headend 150 and to the appropriate hub 140 via hub router 144. Hub router 144 then directs the voice packets to CMTS 142, which sends the packets via RF signals to MTA 119-2 associated with the desired telephone 116-2. Such transmission enables telephone 116-2 to ring in response to the call placed by telephone 116-1.

Voice packets are also transmitted from voice router 171 to PBX 192 via workplace gateway 191 for transmission to workplace telephone 195-2 (step 817) causing such telephone to ring as well. In so doing, voice router 171 sends the voice packets generated by MTA 119-1 via voice router 171 to customer gateway 191 of customer premises 190. This is accomplished using the MGC and TGC protocols. As described above, these protocols, among other things, enables call agent 177 to request that voice gateway 174 send a notification to user MTA 119-1 indicating that the voice packets have been transmitted to workplace 190.

Voice router awaits the receipt of voice packets indicating that the call is answered by telephone 116-2 or workplace telephone 195-2. When, for example, telephone 116-2 is answered, RF signals carrying voice packets are generated by MTA 119-2 of cable modem 118-2 and are transmitted to CMTS 142. The voice packet data includes, among other things, the IP address assigned to MTA 119-2. Hub 140 receives the voice packets from CMTS 142 at hub router 144, which then transmits the voice packets to core circuit router 156 for transmission by an operations fiber circuit to voice router 171 of host 160. Upon receiving such voice packets, voice router 171 recognizes that the call is answered by telephone 116-2 (step 820).

Voice router 171 reads the MAC address of telephone 116-1 and the IP address of MTA 118-1 which initiated the call (and associated workplace telephone 195-1) and that of destination telephone 116-2 (and associated workplace telephone 195-2), forwards the voice packets generated by 119-2 to telephone 116-1 and workplace telephone 195-1 (step 825). At this point, a connection between these devices is established (step 830).

The foregoing merely illustrates the principles of the invention. It will thus be appreciated that those skilled in the art will be able to devise numerous other arrangements which embody the principles of the invention and are thus within its spirit and scope.

For example, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed servers or routers.

In addition, system 100 is disclosed herein as incorporating a T1 line between headend 150 and host 160. It should be noted, however, that other types of high speed connections may be used, including DS3 lines.

System 100 shows host 160 and the associated description is directed to the workplace being an employer's site and the user site being the home (or home office) of an employee of the employer. It should be noted, however, that system 100 may support transmissions by devices of any type of user that is in communication with a device of another user wherein the two or more communication devices are have identification codes that are associated with one another and the devices act as counterparts to one another.

In addition to enabling transmission of voice communication between, for example, two or more telephonic devices, broadband communications network 125 may also support transmission of data information to, for example, two or more computers that have associated identification codes and that act as counterparts to one another as a result of the associated identification codes. System 800 of FIG. 8 illustrates such a network.

Figure 8:
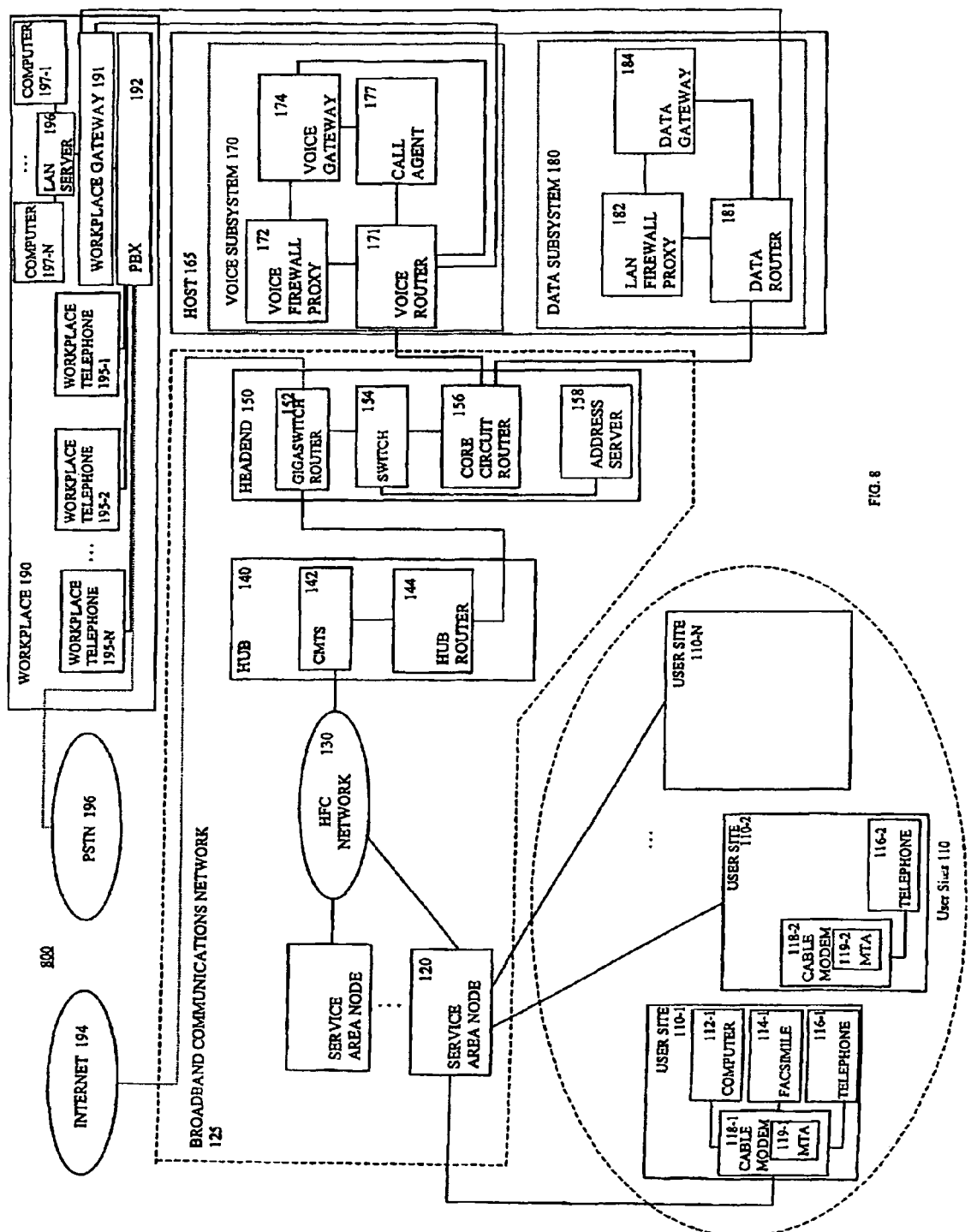
FIG. 8 is a block diagram illustrating an alternative broadband communications system, in accordance with an embodiment of the invention.

FIG. 8 shows many of the same components as those illustrated in FIG. 1. FIG. 8, however, shows host 165 comprising two subsystems—voice subsystem 170 and data subsystem 180. Both subsystems are configured for communicating with the modems located at user sites 110. However, whereas voice subsystem 170 communicates with user PBX 192 as described above, data subsystem 180 communicates with local area network (LAN) server 196 of workplace 190.

Similar to the records associated with telephonic devices described with respect to FIG. 3 which are stored by call agent 177, records containing user name information, identification information, etc. associated with a computer at one of user sites 110 and a corresponding computer at workplace 190 are stored by data gateway 184. Thus, when a user at, let's say, workplace 190 receives an e-mail at, e.g., computer 197-1 via LAN server 196, the e-mail information may also be routed to computer 112-1 by reading identification information stored in the header of received data packets.

Figure 9:
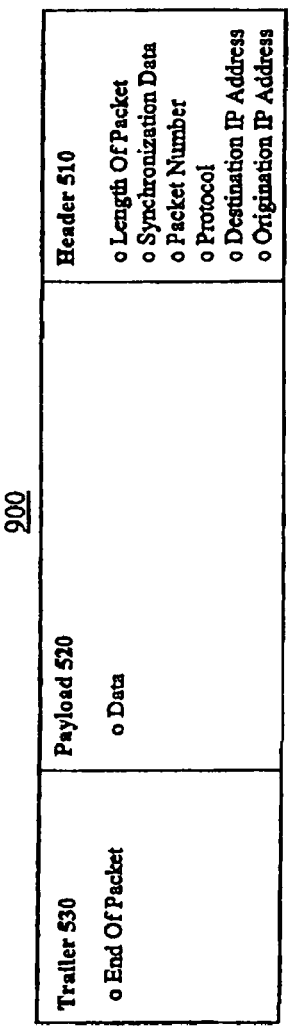
FIG. 9 is a representation of a data packet, processed by the system of FIG. 1, in accordance with an embodiment of the invention.

FIG. 9 shows the structure of a data packet 900 for data communication, in accordance with an embodiment of the invention. The portions include a header 510, payload 520 and trailer 530. Header 510 contains instructions about the data carried by the packet and includes: the length of packet 900; synchronization data that assists with the matching of packet 900 with system 125; packet number which identifies a given packet, e.g. packet 900, within the sequence of packets; the protocol which defines the type of packet that is being transmitted (e.g., email, web page, streaming video, etc.); destination IP address which identifies the destination of where packet 900 is going; and originating IP address which identifies the destination from where packet 900 originated.

Thus, data packets destined for a computer located at workplace 190 are forwarded by LAN server 196 to data router 181 via workplace gateway 191. The packets are then forwarded to data firewall proxy 182 for determining whether the received data packets should be forwarded to their destination. If so, the data packets are forwarded to gateway 184 which accesses a database (not shown) to identify the appropriate remote computer (if any) at one of user sites 110 for transmission thereto.

Similarly, any data traffic generated by computer, for example, 112-1 to another computer (within or outside workplace 190) is transmitted to associated computer 197-1 and vice versa. Such traffic is received by data router 181 and then forwarded to data gateway 184 for identifying the association of such computers. Accordingly, computer 112-1 and computer 197-1 act as counterparts to one another.

It should be noted that although only one workplace is shown in FIGS. 1 and 8, host 160 (FIG. 1) and/or host 165 (FIG. 8) may be configured to support communication with multiple workplaces. In another instance hosts 160 and/or 165 may be dedicated to only one workplace and may not be physically located in such workplace (as illustrated by FIGS. 1 and 8) or may indeed be physically located in such workplace.

What is claimed is:

1. A method for establishing connections between devices, the method comprising:
   receiving at a host a request from a first device to establish communications with a second device, wherein the host is configured to establish a connection between the first and second devices and the first device and a third device;
   deriving at the host a first identification code from the request, wherein the first identification code is stored in a database at the host in association with the second device and in association with a second identification code, and wherein the first identification code identifies the second device and wherein the second identification code identifies the third device;
   using the first identification code to establish a first connection between the first device and the second device;
   using the first identification code to retrieve the second identification code from the database; and
   using the second identification code to establish a second connection between the first device and the third device.

2. The method of claim 1, wherein the first device is connected to a first network, the second device is connected to a second network and the third device is connected to a third network.

3. The method of claim 2, wherein the first network comprises a public switched telephone network, the second network comprises a private branch exchange and the third network comprises a cable network.

4. The method of claim 3, wherein the first identification code comprises a telephone number associated with the second device and the second identification code comprises a telephone number associated with the third device.

5. The method of claim 3, wherein the second identification code comprises an internet protocol address associated with the third device.

6. The method of claim 3, wherein the second identification code comprises a media access control address associated with the third device.

7. The method of claim 1, wherein the second identification code is accessed from a database storing the first identification code in association with the second identification code.

8. The method of claim 1, wherein communications are allowed between at least two of the first device, the second device and the third device.

9. The method of claim 1 further comprising provisioning the second device and the third device to have at least one common feature.

10. The method of claim 9, wherein the common feature comprises voice mail messaging.

11. The method of claim 9, wherein the common feature comprises call transfer.

12. A system for establishing connections between devices, the system comprising:
   a database configured to:
      store a first identification code in association with a second device and a second identification code; and
      store the second identification code in association with a third device;
   an interface configured for receiving from the first device a request to establish communications with the second device;
   a host configured to:
      derive the first identification code from the request, wherein the first identification code identifies the second device; and
      use the first identification code to establish a first connection between the first device and the second device;
      use the first identification code to retrieve the second identification code from the database; and
      use the second identification code to establish a second connection between the first device and the third device.

13. The system of claim 12, wherein the first device is connected to a first network, the second device is connected to a second network and the third device is connected to a third network.

14. The system of claim 13, wherein the first network comprises a public switched telephone network, the second network comprises a private branch exchange and the third network comprises a cable network.

15. The system of claim 14, wherein the first identification code comprises a telephone number associated with the second device.

16. The system of claim 14, wherein the second identification code comprises an internet protocol address associated with the third device.

17. The system of claim 14, wherein the second identification code comprises a media access control address associated with the third device.

18. The system of claim 12, wherein communications are allowed between at least two of the first device, the second device and the third device.

19. The system of claim 12, wherein the second device and the third device are provisioned to have at least one common feature.

20. The system of claim 19, wherein the common feature comprises voice mail messaging.

21. The system of claim 19, wherein the common feature comprises call transfer.

\* \* \* \* \*